T. TULLY.
Faucet.

No. 159,981. Patented Feb. 16, 1875.

WITNESSES
W. T. Newman
R. M. Barr

INVENTOR
Thomas Tully
By Leggett & Leggett, Attorneys.

THE GRAPHIC CO.PHOTO-LITH.39 & 41 PARK PLACE,N.Y.

UNITED STATES PATENT OFFICE.

THOMAS TULLY, OF SPRINGFIELD, ILLINOIS, ASSIGNOR OF ONE-HALF HIS RIGHT TO W. H. DOAN, OF CLEVELAND, OHIO.

IMPROVEMENT IN FAUCETS.

Specification forming part of Letters Patent No. 159,981, dated February 16, 1875; application filed January 19, 1875.

*To all whom it may concern:*

Be it known that I, THOMAS TULLY, of Springfield, in the county of Sangamon and State of Illinois, have invented certain new and useful Improvements in Faucets and Valves; and I do hereby declare the following to be a full, clear, and exact description of the invention, such as will enable others skilled in the art to which it pertains to make and use it, reference being had to the accompanying drawings, which form part of this specification.

My invention relates to faucets or valves for drawing off oil or other liquids from cans, &c.; and consists, first, in forming the valve itself of soft lead by casting the same into the valve-seat as a mold; second, in combining, with the said valve, a flattened stem, the stem passing through a corresponding orifice in the faucet, whereby the valve is always guided to the same seat; third, the combination, with a faucet that has either a regular or an irregular valve-seat, of a valve formed by casting it into the said valve-seat, whereby its irregularities will have their counterpart in the valve; and mechanism for guiding the said valve always to the same seat.

Figure 1:
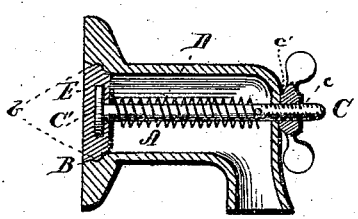
Figure 2:
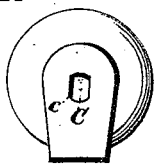
Figure 3:
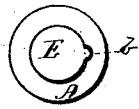
Figure 4:
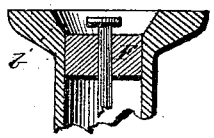

In the drawing, Figure 1 represents a sectional view of my improved faucet and valve. Fig. 2 is a plan view of the top or end of the faucet with the nut removed, showing the flattened form of the stem. Fig. 3 is a view of the bottom of the valve as it appears after having been cast into the valve-seat. Fig. 4 is a cross-section of the faucet, representing a piece of cork inside of the faucet, which is designed to prevent the molten metal from running into the body of the valve, and to give the proper form to the inside or back of the valve.

A is a faucet of ordinary form. B is a valve-seat formed therein. *b* represents irregularities that may exist in the valve-seat. These irregularities may occur in forming the said valve-seat, as in turning it down, for instance; or it may be caused by flaw in the casting; or it may be caused by wear or the action of grit. So, also, it may occur in forming the valve-seat, whereby it may be made oval, instead of round; or it may represent any other irregularity in the said valve-seat, whereby a valve as ordinarily constructed would not fit the said valve-seat, but would cause the liquid to leak out through the said irregularities. C is a valve-stem, screw-cut for the reception of the nut D, and provided with a head or cross-piece, C', around which the valve is cast, thus forming a firm attachment of the valve to the shaft. The valve-rod C is flattened at *c*, and passes through a corresponding orifice, *c'*, in the faucet, whereby the valve is prevented from turning in its seat, and is always guided each time into precisely the same seat. E is the valve, of lead or other soft metal. It is formed as follows: A valve-rod is placed in the faucet in such a manner or position as to bring the head or cross-piece C' into its proper position, as indicated in Fig. 4. The lead or other soft metal is then poured, in a molten condition, into the valve-seat upon the cork. It will, of course, conform itself exactly to the valve-seat, and will shape itself to any of the irregularities, whether in shape or in workmanship, that may exist in the said valve-seat; and, in cooling, it will close around the head or cross-piece C', forming a rigid attachment to the shaft C. The flattened form of the shaft C, passing a corresponding orifice in the faucet, will necessarily cause the said valve always to take the same position in the valve-seat, so that no matter what irregularities may subsist in the valve-seat this way of making the valve will cause necessarily a tight joint. Moreover, should grit of any description, or any other slight impediment, become caught between the valve and its seat, the material of which the valve is composed would cause the grit or impediment to bury itself therein, leaving the joint tight, as before.

A spiral spring, or its equivalent, D, is placed upon the shaft C, so that as the nut *c* is loosened this spring will cause the valve to open.

It is obvious that, instead of forming the valve-stem in the manner shown, to be opened and closed through the medium of the nut, any other suitable method may be employed.

The spiral spring is not an essential element of the invention, for any other method of opening the valve might be employed, but the device shown is simple and efficacious.

So, also, the flattened stem might be replaced with any suitable mechanism, whereby the valve would be guided always into the same seat.

What I claim as new, and desire to secure by Letters Patent, is—

1. A valve formed by casting it into its valve-seat, substantially as and for the purpose described.

2. The combination, with a regular or irregular valve-seat, of a valve of soft metal, formed by casting it into the said valve-seat, substantially as and for the purpose described.

3. The combination, with a valve, formed by casting it into its valve-seat, of a suitable guide, consisting of the flattened top end $c$ of the valve-stem and square hole $c'$ in the top of the faucet A, whereby the said valve is made always to take the same seat, substantially as and for the purposes described.

4. The combination, with the valve-stem C, of a valve of soft fusible metal E, formed by casting the said valve over a head or cross-bar, C', substantially as and for the purpose described.

5. The combination, with the valve-seat B and the valve E cast therein, of the flattened stem C and a corresponding square orifice in top of the faucet A, whereby the valve is guided always to the same seat, substantially as and for the purpose described.

6. The combination of the valve-seat B, the valve E cast therein, the flattened stem C, and nut $c$, substantially as and for the purpose described.

7. The combination, with a faucet, of a valve-seat, B, and valve E cast therein, stem C, spiral spring D, and nut $c$, substantially as and for the purpose described.

In testimony whereof I have signed my name to this specification in the presence of two subscribing witnesses.

THOMAS TULLY.

Witnesses:
FRANCIS TOMNEY,
H. T. HOWER.